Patented Feb. 13, 1945

2,369,139

UNITED STATES PATENT OFFICE 2,369,139

METHOD OF TREATING BONE BLACK

Victor R. Deitz, Washington, D. C., assignor to the Government of the United States, as represented by the Secretary of Commerce No Drawing. Application March 27, 1943, Serial No. 480,848

2 Claims. (Cl. 252—296)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a method of obtaining a highly active bone black from new bone black, service bone black, or spent bone black. New bone black is commercial bone black such as is commonly supplied to and used by sugar refineries for decolorizing sugar. Service bone black is bone black which has been used in the decolorizing of sugar, which may have been revivified or reactivated a number of times, and which is not spent. Spent bone black is bone black which has been used in decolorizing sugar and which is so contaminated that its revivification according to conventional procedure is neither economical nor practical. Each of these starting materials is to be understood as falling within the definition of the generic term bone black stock as used in the following description and the appended claims. For convenience, the product of this invention will be called the bone black product.

Heretofore, it has been the practice to acid wash bone black and then to drive off volatile material of the acid washed bone black as by heating to a relatively low temperature. This prior practice, however, resulted in a bone black of decreased hardness and of increased tendency to crumble in use. In other words, the resulting bone black was characterized by excessive dusting. This prior practice secured a product having an adsorptive power which was only a fraction of the adsorptive power of the treated bone black when new.

It is the discovery of the present invention that bone black stock may be treated by first heat shrinking and then acid washing to secure a bone black product of enhanced adsorption power without loss of hardness of the bone black particles. The heat shrinking step of this invention, if not followed by the acid washing step, may result in almost complete reduction of the adsorptive power of the bone black. As above indicated, the acid washing procedure, if not preceded by the heat shrinking step, provides a product having the stated objections. However, when the heating and acid washing method of this invention is followed, the product is highly active, hard and particularly efficient as a decolorizing medium.

A further discovery of this invention is that certain materials may be added to the bone black stock prior to the described heat shrinking step for securing improved mechanical properties for the particles in the bone black product and for increasing the carbon content of the bone black product.

An object of this invention, therefore, is to provide a method for treating bone black stock to secure a highly active bone black product.

Still another object is to provide a method for obtaining a highly active and relatively hard bone black product.

A further object is to provide a relatively simple, inexpensive, and efficient method for improving the adsorptive properties of new bone black and service bone black and for revivifying spent bone black.

Another object is to provide a method for securing a bone black product which has improved mechanical properties.

Still another object is to provide a method for securing a highly active and relatively hard bone black product of increased carbon content.

Other objects and advantages of this invention will be apparent from the following description and the appended claims.

In the practice of this invention, bone black stock is heat-treated in an inert atmosphere for a period of from about five to about twenty-four (5 to 24) hours and at temperatures in the range of from 600° C. to 900° C. This heating step may be carried out in a retort and at or about atmospheric pressure. In the treatment of new bone black it is recommended that the retorting or heating step be continued for a minimum of five or six (5 or 6) hours. A somewhat longer retorting or heating treatment is required for spent bone black. In treating spent bone black, it is recommended that the heating or retorting step be continued for a period of from about eighteen to about twenty-four (18 to 24) hours. The heating step results in the shrinking of the treated material and the formation of relatively harder particles.

Following its heat treatment at a temperature of from 600° C. to 900° C. the bone black stock is subjected to a limited acid washing treatment. Any suitable dilute acid may be used in the washing of the heat treated bone black. The acid may be any dilute mineral acid or organic acid. The dilute acid washing is also so controlled as to secure the desired proportioning of the carbon and mineral matter content in the bone black product. The acid dilution and washing control may follow the conventional practice for the acid washing of bone black. An extended acid washing of the heat-shrunk bone black will secure an especially active substance, although the hardness of the particles is somewhat diminished. The product of the extended acid washing, however, may be united into a mechanically stronger, granular structure by the addition of a suitable binding material and according to conventional practice.

It has been discovered that when bone black stock is heat treated and then acid washed according to the present invention, the bone black product is formed of relatively hard granular particles and is two to ten times more efficient in decolorizing sugar than the fresh or new (unused) bone black heretofore supplied to the sugar refining industry.

The acid washed bone black is treated by washing it with water on a filter grid with openings large enough to allow the extracted material and dust to pass out, but small enough to retain the desired particles of the activated bone black (the bone black product).

Following the hot water washing step, the bone black product may be reheated to a temperature of about 300° C. for the purpose of volatilizing and eliminating any remaining traces of the acid used in the acid washing step.

The hardness, activity and efficiency of the bone black product may be further increased by the mixing of certain inorganic bases, salts and acids with the bone black stock prior to its heat shrinking treatment, above described. In selecting the inorganic material to be added to the bone black stock, those materials are selected which will in part enter into the apatite crystal structure of the bone black being treated. An ion of the added base, salt or acid replaces an isomorphous ion on and near the surface of the apatite crystal structure, the substituted ion having the characteristic of contributing more to the hardness of the structure than the ion it replaces. Among those substances which may be added to the bone black stock before the heat shrinking treatment are sodium silicate, phosphoric acid, trisodium phosphate, fluosilicic acid, calcium carbonate and calcium oxide. By the addition of one or more of these inorganic bases, salts and acids to the bone black stock prior to the heat shrinking treatment, a greater shrinkage of the bone black particles is secured with a corresponding increase in hardness and efficiency of the product secured in the acid washing step. The addition of the inorganic material, when practiced with the present heat shrinking and acid treatments, markedly improves the mechanical properties of the bone black particles. The amount of inorganic material to be added to the bone black stock is dictated by the character of such stock. Thus, the addition of inorganic material in the amount of about twenty to twenty-five per cent (20% to 25%) by weight is recommended where the stock is new bone black. If the stock is spent bone black, the inorganic material is added in smaller amount. An addition of inorganic material in an amount of one to five per cent (1% to 5%) by weight is recommended when the stock is spent bone black.

A bone black product which is relatively hard and highly active and also of increased carbon content may be secured by adding carbonaceous material to the bone black stock prior to the described heat shrinking step. The carbonaceous material may be molasses, raw cane sugar, bone oil, pectins, gum arabic, starch, and gelatin, or other carbohydrate or protein.

Examples of methods embodying this invention and the features hereinbefore described are given below. In each example, the bone black stock was of 8 to 16 mesh particle size. That is, the stock particles pass through a screen having eight (8) meshes to the linear inch, but do not pass through a screen having sixteen (16) meshes to the linear inch. In each example, the entire treatment was carried out at or about atmospheric pressure.

*Example 1*

One hundred (100 gr.) grams of new bone black was charged into a steel tube and heated in an inert atmosphere of nitrogen for about eighteen (18) hours at a temperature of 800° C. The charge was then cooled in the same atmosphere. The cooled charge was washed with dilute citric acid at a temperature of 70° C. The acid treated or acid washed material was washed with hot water. The resulting product (bone black product) was a granular residue having a carbon content of sixteen per cent (16%) by weight, and having approximately twice the adsorption power of the original material (new bone black). The particles of the product were also substantially harder than the particles of the original material.

*Example 2*

One hundred grams (100 gr.) of new bone black were mixed with a solution of twenty five grams (25 gr.) of sodium silicate in water. The mixture was evaporated to dryness, charged into a steel tube, and heated to 750° C. in an inert atmosphere of nitrogen. After seventeen (17) hours of this heat treatment at 750° C. in the nitrogen atmosphere, the charge was cooled in the same nitrogen atmosphere. The cooled charge was washed with dilute hydrochloric acid (1:6) solution and then washed with hot water. This method yielded a product of enhanced adsorption power and as hard as the original new bone black.

*Example 3*

One hundred grams (100 gr.) of service bone black were treated with ten grams (10 gr.) of phosphoric acid in dilute solution. The mixture was evaporated to dryness. The dried mixture or material was charged into a steel tube and heated to a temperature of 750° C. in an atmosphere of nitrogen. The heating at this temperature in the nitrogen atmosphere was continued for fifteen (15) hours. The material was then cooled in the same nitrogen atmosphere. Subsequent extraction with dilute citric acid, followed by washing with hot water, produced a residue or bone black product of enhanced adsorption power and having a hardness as great as the original material.

*Example 4*

One thousand grams (1,000 gr.) of service bone black were mixed with 250 grams of raw cane sugar in 200 ml. of water. The mixture was air-dried at 110° C. Portions of the dried mixture were heated in a steel tube for about fifteen (15) hours at a temperature of 800° C. in an inert atmosphere of helium. After cooling in the same atmosphere, the residue was extracted with dilute hydrochloric acid (1:6) solution and then washed with hot water. The residual matter possessed enhanced adsorption power and a hardness greater than the original service bone black.

Example 5

Spent bone black discarded by a sugar refinery and in an amount of 500 grams was treated with a phosphoric acid solution containing about ten per cent (10%) by weight of the acid. The mixture was dried. The dried mixture was heated in a nitrogen atmosphere and at a temperature of 700° C. for eighteen (18) hours. The heat treated mixture was cooled, extracted with dilute hydrochloric acid and washed with hot water. The residue (bone black product) showed higher adsorption power than the starting material (spent bone black). The residue also showed higher adsorption power and greater hardness than another residue resulting from the same treatment of the discarded, spent bone black but with the preliminary heat shrinking step omitted.

The foregoing is to be understood as given by way of illustration, since this invention includes all modifications and embodiments coming within the scope of the appended claims.

I claim:

1. The method of treating bone black stock to secure a highly active bone black product, comprising the steps of providing stock consisting essentially of bone black of not less than about 16 mesh particle size, heat treating said stock at temperatures within the range of 600° C. to 900° C. for a period of from about five to about twenty-four hours in an inert atmosphere, and subjecting said heat treated stock to limited acid washing with dilute acid and then to washing with water to secure a granular residue of carbon and material having the characteristic phosphate crystalline apatite structure of bone black, the carbon in said residue not exceeding about sixteen per cent by weight.

2. The method of treating new bone black to enhance its adsorption power, said method comprising the steps of heat treating stock consisting of new bone black of not less than about 16 mesh particle size for about eighteen hours at a temperature of about 800° C. in an inert atmosphere of nitrogen, washing said heat treated stock with dilute citric acid at a temperature of about 70° C., and then washing said stock with hot water, said washing steps providing a product in the form of a granular residue having a carbon content of about sixteen per cent by weight, the remainder of said residue being essentially material having the characteristic prosphate apatite crystalline structure of bone black.

VICTOR R. DEITZ.